United States Patent
Kosaka et al.

(10) Patent No.: US 11,088,367 B2
(45) Date of Patent: Aug. 10, 2021

(54) METHOD FOR PRODUCING ACTIVE MATERIAL, ACTIVE MATERIAL AND BATTERY

(71) Applicant: TOYOTA JIDOSHA KABUSHIKI KAISHA, Aichi-ken (JP)

(72) Inventors: Daichi Kosaka, Susono (JP); Jun Yoshida, Mishima (JP); Tetsuya Waseda, Tokyo-to (JP); Takamasa Otomo, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/594,094

(22) Filed: Oct. 7, 2019

(65) Prior Publication Data
US 2020/0119352 A1 Apr. 16, 2020

(30) Foreign Application Priority Data
Oct. 15, 2018 (JP) .............................. JP2018-194326

(51) Int. Cl.
*H01M 4/00* (2006.01)
*H01M 4/58* (2010.01)
(Continued)

(52) U.S. Cl.
CPC ............... *H01M 4/58* (2013.01); *C01B 33/06* (2013.01); *H01M 10/054* (2013.01);
(Continued)

(58) Field of Classification Search
CPC ........... H01M 2004/027; H01M 4/386; H01M 4/134; H01M 10/054; C01P 2002/72; C01B 33/06
See application file for complete search history.

(56) References Cited

U.S. PATENT DOCUMENTS 6,423,286 B1 * 7/2002 Gryko .................... C01B 33/06
136/236.1
2012/0021283 A1 1/2012 Chan et al.
(Continued)

OTHER PUBLICATIONS

Lakshmi Krishna et al., "Group IV clathrates: synthesis, optoectronic properties, and photovoltaic applications", Physics, Simulation, and Photonic Engineering of Photovoltaic Devices III, Proc. of SPIE vol. 8981,898108, 2014, 11pp.
(Continued)

*Primary Examiner* — Cynthia H Kelly
*Assistant Examiner* — Monique M Wills
(74) *Attorney, Agent, or Firm* — Hauptman Ham, LLP (57) ABSTRACT

A main object of the present disclosure is to provide a novel active material of which volume change due to charge and discharge is small. The present disclosure achieves the object by providing a method for producing an active material having a composition represented by $Na_xM_ySi_{46}$ (M is a metal element other than Na, x and y satisfy $0<x$, $0≤y$, $y≤x$, and $0<x+y<8$), and a silicon clathrate I type crystal phase, the method comprising: a preparing step of preparing a precursor compound having the silicon clathrate I type crystal phase; and a liquid treatment step of bringing the precursor compound into contact with a polar liquid so as to desorb a Na element from the precursor compound and obtain the active material.

20 Claims, 5 Drawing Sheets

(51) Int. Cl.
    *C01B 33/06*    (2006.01)
    *H01M 10/054*   (2010.01)
    *H01M 10/0585*  (2010.01)
    *H01M 4/02*     (2006.01)

(52) U.S. Cl.
    CPC ..... *H01M 10/0585* (2013.01); *C01P 2002/72* (2013.01); *C01P 2006/40* (2013.01); *H01M 2004/027* (2013.01)

(56) References Cited

U.S. PATENT DOCUMENTS

2015/0376016 A1* 12/2015 Krishna ................ C01B 33/021
                                                252/62.3 T
2015/0380724 A1* 12/2015 Chan .................... H01M 4/131
                                                    429/50

OTHER PUBLICATIONS

Thorsten Langer et al., "Electrochemical Lithiation of Silicon Clathrate-II" Journal of the Electrochemical Society, 159 (8), A1318-A1322, published Jul. 20, 2012, The Electrochemical Society, 5pp.
Ying Li et al., "Type I Clathrates as Novel Silicon Anodes: An Electrochemical and Structural Investigation", Advanced Science, 2015, WILEY-VCH Verlag GmbH & Co., 12pp.
Unpublished U.S. Appl. No. 16/504,210, filed Jul. 5, 2019, 62pp.
Bodo Bohme et al, "Oxidation of $M_4Si_4$(M=Na,K) to Clathrates by HCl or $H_2O$", J. Am. Chem. Soc. 2007, 129. pp. 5348-5349, published Apr. 4, 2007, JACS Communications, 2pp.

* cited by examiner

Silicon clathrate I type

FIG. 2B

Diamond type silicon

METHOD FOR PRODUCING ACTIVE MATERIAL, ACTIVE MATERIAL AND BATTERY

RELATED APPLICATIONS

The present application claims priority to Japanese Patent Application No. 2018-194326 filed Oct. 15, 2018, the disclosure of which is hereby incorporated by reference herein in its entirety.

TECHNICAL FIELD

The present disclosure relates to a method for producing an active material, an active material and a battery.

BACKGROUND ART

In recent years, development of batteries has been actively undergone. For example, in automobile industries, the development of a battery to be utilized for an electronic vehicle or a hybrid vehicle has been advanced. Also, as an active material used in the battery, a Si particle has been known.

Patent Literature 1 discloses an electrode for a battery containing a silicon clathrate. Also, Non-Patent Literature 1 discloses that the compound having silicon clathrate II type crystal phase is used as an anode active material in a lithium ion battery. Further, Non-Patent Literature 2 discloses that $Ba_8Al_8Si_{38}$ clathrate is fabricated by burning a Si—Al—Ba powder compressed body and conducting HCL washing and NaOH washing thereof.

CITATION LIST

Patent Literature

Patent Literature 1: US Patent Application Laid-Open No. 2012/0021283

Non-Patent Literature

Non-Patent Literature 1: Thorsten Langer et al., "Electrochemical Lithiation of Silicon Clathrate-II", Journal of The Electrochemical Society, 159(8) A1318-A1322 (2012)

Non-Patent Literature 2: Ying Li et al., "Type I Clathrates as Novel Silicon Anodes: An Electrochemical and Structural Investigation", Adv. Sci. 2015, 2, 1500057

SUMMARY OF DISCLOSURE

Technical Problem

The theoretical capacity of Si particles is large, which is advantageous in high energy condensation of a battery. On the other hand, the volume change of Si particles is large during charge and discharge.

The present disclosure has been made in view of the above circumstances, and a main object thereof is to provide a novel active material of which volume change due to charge and discharge is small. Incidentally, the active material in the present disclosure may be referred to as a silicon clathrate compound in some cases.

Solution to Problem

In order to achieve the object, the present disclosure provides a method for producing an active material having a composition represented by $Na_xM_ySi_{46}$ (M is a metal element other than Na, x and y satisfy $0<x$, $0 \leq y$, $y \leq x$, and $0<x+y<8$), and a silicon clathrate I type crystal phase, the method comprising: a preparing step of preparing a precursor compound having the silicon clathrate I type crystal phase; and a liquid treatment step of bringing the precursor compound into contact with a polar liquid so as to desorb a Na element from the precursor compound and obtain the active material.

According to the present disclosure, by conducting the liquid treatment using the polar liquid to the precursor compound having the silicon clathrate I type crystal phase, an active material of which volume change due to charge and discharge is small, may be obtained. In particular, by conducting the liquid treatment, an Na element may be efficiently desorbed while maintaining the silicon clathrate I type crystal structure.

In the disclosure, the polar liquid may contain at least one kind of water, alcohol, and inorganic acid.

In the disclosure, the polar liquid may contain at least one kind of water and alcohol.

In the disclosure, the preparing step may be a step of conducting a heat treatment to a NaSi compound containing at least a Na element and a Si element under decompressed pressure so as to desorb the Na element from the NaSi compound and obtain the precursor compound.

In the disclosure, heat treatment temperature may be less than 550° C. and heat treatment time may be 12 hours or less.

In the disclosure, the x and the y may satisfy $1.1 \leq x+y$.

Also, the present disclosure provides an active material comprising a composition represented by $Na_xM_ySi_{46}$ (M is a metal element other than Na, x and y satisfy $0<x$, $0 \leq y$, $y \leq x$, and $0<x+y<8$), and a silicon clathrate I type crystal phase; wherein a residue of a polar liquid is present on a surface of the active material.

According to the present disclosure, the presence of the residue of the polar liquid on the surface of the active material may specify that the above described production method was used.

In the disclosure, the residue of the polar liquid may contain at least one kind of alcohol and inorganic acid.

Also, the present disclosure provides a battery comprising a cathode layer, an electrolyte layer, and an anode layer in this order, wherein the anode layer contains the above described active material.

According to the present disclosure, the anode layer contains the above described active material (silicon clathrate compound) and thus the volume change of the battery due to charge and discharge may be small. Accordingly, a battery with excellent battery characteristics such as capacity may be obtained.

Advantageous Effects of Disclosure

The present disclosure exhibits effects such that an active material of which volume change due to charge and discharge is small, may be obtained.

DESCRIPTION OF EMBODIMENTS

The method for producing an active material, the active material and the battery in the present disclosure are hereinafter described in details.

A. Active Material

Figure 1:
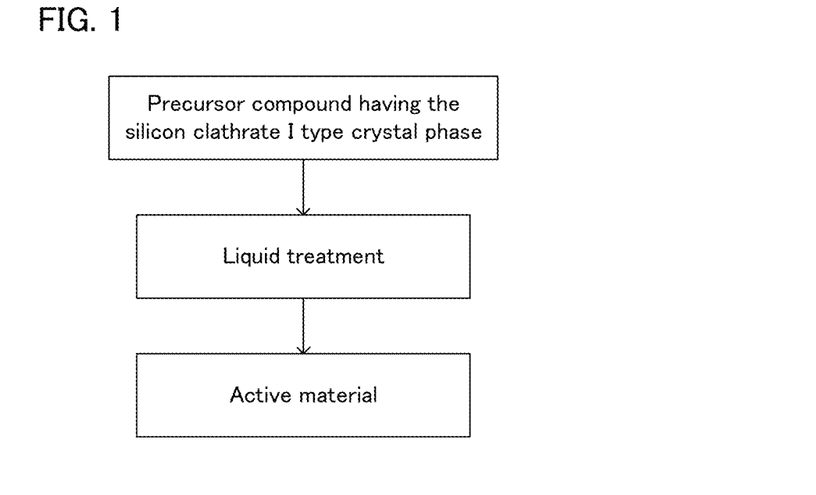
FIG. 1 is a flow chart illustrating an example of the method for producing an active material in the present disclosure.

FIG. 1 is a flow chart illustrating an example of the method for producing an active material in the present disclosure. In FIG. 1, first, a precursor compound having the silicon clathrate I type crystal phase is prepared (preparing step). Next, the precursor compound is brought into contact with a polar liquid so as to desorb a Na element from the precursor compound and obtain an active material (liquid treatment step). The obtained active material has a composition represented by $Na_xM_ySi_{46}$ (M is a metal element other than Na, x and y satisfy $0<x$, $0≤y$, $y≤x$, and $0<x+y<8$), and a silicon clathrate I type crystal phase.

According to the present disclosure, by conducting the liquid treatment using the polar liquid to the precursor compound having the silicon clathrate I type crystal phase, an active material of which volume change due to charge and discharge is small, may be obtained. In particular, by conducting the liquid treatment, an Na element may be efficiently desorbed while maintaining the silicon clathrate I type crystal structure.

Also, since the volume change of the active material in the present disclosure due to charge and discharge is small, for example, a battery with excellent battery characteristics such as capacity and cycle properties may be obtained. Particularly regarding an all solid state battery, it is generally required to apply high confining pressure in order to restrain the volume change due to charge and discharge; however, it is possible to achieve reduction of the confining pressure when the active material in the present disclosure is used. As the result, increase in the size of confining jig may be inhibited.

Figure 2A:
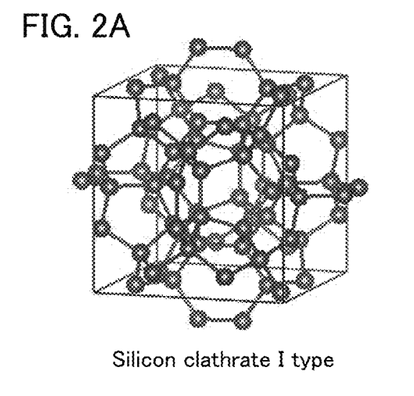
FIGS. 2A and 2B are explanatory views explaining the active material in the present disclosure.
Figure 2B:
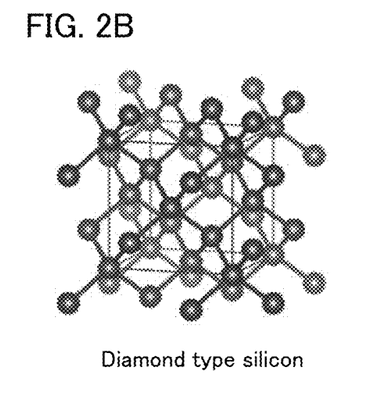

Also, the active material in the present disclosure has the silicon clathrate I type crystal phase. In the silicon clathrate I type crystal phase, as shown in FIG. 2A, a plurality of Si elements form a polyhedron including a pentagon or a hexagon. The polyhedron has a space therein where a metal ion such as Li ion may be included. Intercalation of a metal ion in this space may inhibit the volume change due to charge and discharge. Also, since the silicon clathrate I type crystal phase has the space therein where a metal ion may be included, one of the advantages thereof is that the crystal structure is easily maintained even when charge and discharge are repeated. Incidentally, a usual Si particle has a diamond type crystal phase. In the diamond type crystal phase, as shown in FIG. 2B, a plurality of Si elements form a tetrahedron. The tetrahedron does not have a space therein where a metal ion such as a Li ion may be included, and thus the volume change due to charge and discharge is large.

Patent Literature 1 discloses an electrode for a battery containing a silicon clathrate. Meanwhile, in Patent Literature 1, a silicon clathrate is not synthesized in fact, but factors such as stress-strain of various LiSi compounds are evaluated by simulation. Incidentally, Patent Literature 1 neither describes nor suggests about the silicon clathrate containing a Na element.

Also, Non-Patent Literature 1 discloses that the compound having silicon clathrate II type crystal phase is used as an anode active material in a lithium ion battery. In more specific, it discloses a lithium ion battery using a compound having a composition represented by $Na_xSi_{136}$ and a silicon clathrate II type crystal phase, as the anode active material. Meanwhile, in lines 8 to 12 of left column on A1318 in Non-Patent Literature 1, it is described that $Na_xSi_{136}$ (silicon clathrate II type) may be obtained when Na is desorbed from $Na_8Si_{46}$ (silicon clathrate I type). In other words, it is neither described nor suggested about maintaining the silicon clathrate I type crystal phase while desorbing Na.

It can be said that the active material in the present disclosure is a novel active material on the point it has the silicon clathrate I type crystal phase while having a composition of which number of Na is less than that of $Na_8Si_{46}$. In particular, the active material in the present disclosure has a composition of which number of Na is less than that of $Na_8Si_{46}$, and thus more metal ions such as a Li ion can be included. On that point also, the volume change due to charge and discharge may be inhibited. Also, the active material in the present disclosure has the silicon clathrate I type crystal phase. The silicon clathrate I type crystal phase includes Si polyhedrons having large space in higher ratio than the silicon clathrate II type crystal phase; thus it is advantageous on the points of inhibiting volume expansion and maintaining crystal structure during the intercalation of metal ions.

Also, Non-Patent Literature 2 discloses that $Ba_8Al_8Si_{38}$ clathrate is fabricated by burning a Si—Al—Ba powder compressed body and conducting HCL washing and NaOH washing thereof. In Non-Patent Literature 2, the HCl washing is conducted to remove impurity ($BaSi_2$) in the burned Si—Al—Ba powder compressed body, and the NaOH washing is conducted to remove unreacted Si. In this manner, in Patent Literature 2, the HCl washing and the NaOH washing are conducted only to impurities besides $Ba_8Al_8Si_{38}$ clathrate.

1. Preparing Step

The preparing step in the present disclosure is a step of preparing a precursor compound having the silicon clathrate I type crystal phase. The precursor compound may be prepared by fabricating on one's own and may be prepared by purchasing thereof from others.

The precursor compound has the silicon clathrate I type crystal phase. The precursor compound may have the silicon clathrate I type crystal phase as a main phase, and may have other crystal phase as the main phase.

Incidentally, the silicon clathrate I type crystal phase contains at least a Na element and a Si element, and may and may not contain a M element.

The silicon clathrate I type crystal phase has typical peaks at the positions of 2θ=19.44°, 21.32°, 30.33°, 31.60°, 32.82°, 36.29°, 52.39°, and 55.49°, in an X-ray diffraction measurement using a CuKα ray. These peak positions respectively may be shifted in the range of ±1.00°, may be shifted in the range of ±0.50°, and may be shifted in the range of ±0.30°. Incidentally, when a metal ion such as a lithium ion is intercalated into the silicon clathrate I type crystal phase, a peak shift may occur in some cases. Accordingly, the XRD measurement is preferably conducted in the state the metal ion is not intercalated.

Also, the precursor compound may and may not have a Zintl phase. The Zintl phase has typical peaks at the positions of 2θ=16.10°, 16.56°, 17.64°, 20.16°, 27.96°, 33.60°, 35.68°, 40.22°, and 41.14°, in an X-ray diffraction measurement using a CuKα ray. These peak positions respectively may be shifted in the range of ±1.00°, may be shifted in the range of ±0.50°, and may be shifted in the range of ±0.30°.

Also, the precursor compound may and may not have the diamond type Si crystal phase. The diamond type Si crystal phase has typical peaks at the positions of 2θ=28.44°, 47.31°, 56.10°, 69.17°, and 76.37°, in an X-ray diffraction measurement using a CuKα ray. These peak positions respectively may be shifted in the range of ±1.00°, may be shifted in the range of ±0.50°, and may be shifted in the range of ±0.30°.

Also, the precursor compound may and may not have the silicon clathrate II type crystal phase. The silicon clathrate II type crystal phase usually belongs to the space group Fd-3m. The silicon clathrate II type crystal phase has typical peaks at the positions of 2θ=20.09°, 21.00°, 26.51°, 31.72°, 36.26°, and 53.01°, in an X-ray diffraction measurement using a CuKα ray. These peak positions respectively may be shifted in the range of ±1.00°, may be shifted in the range of ±0.50°, and may be shifted in the range of ±0.30°.

It is preferable that the precursor compound has a composition represented by $Na_xM_ySi_{46}$ (M is a metal element other than Na, x and y satisfy $0<x$, $0 \leq y$, $y \leq x$, and $0<x+y \leq 10$). The M is a metal element other than Na, and examples thereof may be an alkali metal element. Examples of the alkali metal element may include a Li element, a K element, a Rb element, and a Cs element. Also, an additional example of the M may be an alkaline earth metal element. Examples of the alkaline earth metal element may include a Mg element, a Ca element, a Sr element, and a Ba element. Further additional examples of the M may include the 11$^{th}$ group element such as a Cu element, a Ag element, and a Au element; the 12$^{th}$ group element such as a Zn element; the 13$^{th}$ group element such as a B element, an Al element, a Ga element, an In element, and a Tl element; the 14$^{th}$ group element such as a Ge element; the 15$^{th}$ group element such as a Sb element; the 16$^{th}$ group element such as a Te element; and a lanthanoid such as a La element and a Eu element. Also, as the M, a transition metal element such as a Ni element may be used.

The "x" usually satisfy $0<x$, may satisfy $4 \leq x$, and may satisfy $5 \leq x$. Meanwhile, the "x" may, for example, satisfy $x \leq 10$, may satisfy $x \leq 9$, and may satisfy $x \leq 8$. Also, the "y" may be 0 and may satisfy $0<y$. Also, the "x" and the "y" satisfy $y \leq x$. The molar ratio ($(x/(x+y))$) of the "x" to the total of the "x" and the "y" is, usually 0.5 or more, may be 0.7 or more, and may be 0.9 or more.

The total (x+y) of the "x" and the "y" usually satisfy $0<x+y$, may satisfy $4 \leq x+y$, and may satisfy $5 \leq x+y$. Meanwhile, x+y satisfies, for example, $x+y \leq 10$, may satisfy $x+y \leq 9$, and may satisfy $x+y \leq 8$.

An example of the method for producing the precursor compound may be a method of obtaining the precursor compound by conducting a heat treatment to a NaSi compound containing at least a Na element and a Si element under decompressed pressure so as to desorb the Na element from the NaSi compound.

The NaSi compound contains at least a Na element and a Si element. Also, the NaSi compound may further contain the above described M element, and may not contain the M element. Also, the NaSi compound preferably has the above described Zintl phase. The reason therefor is to easily obtain the silicon clathrate I type crystal phase.

The NaSi compound may be obtained by, for example, conducting a heat treatment to a raw material mixture containing a simple substance of Na and a simple substance of Si. The raw material mixture may and may not contain a simple substance of the M element. There are no particular limitations on the ratio of the simple substance of Na and the simple substance of Si in the raw material mixture. The simple substance of Na to 1 molar part of the simple substance of Si is, for example, 0.8 molar parts or more, may be 1 molar part or more, and may be 1.1 molar parts or more. Meanwhile, the simple substance of Na to 1 molar part of the simple substance of Si is, for example, 1.5 molar parts or less, may be 1.3 molar parts or less, and may be 1.2 molar parts or less. Heat treatment temperature is, for example, 500° C. or more and 1000° C. or less. Also, heat treatment time is, for example, 1 hour or more and 50 hours or less.

Also, the precursor compound may be obtained by conducting the heat treatment to the NaSi compound under decompressed pressure so as to desorb a Na element from the NaSi compound. The pressure during the heat treatment is, for example, 10 Pa or less, may be 1 Pa or less, and may be 0.1 Pa or less. Also, heat treatment temperature is, for example, 100° C. or more, may be 200° C. or more and may be 400° C. or more. Meanwhile, heat treatment temperature is, for example, less than 550° C., and may be 500° C. or less. Heat treatment time is, for example, 30 minutes or more and may be 3 hours or more. Meanwhile, the heat treatment time is, for example, 20 hours or less, and may be 12 hours or less.

2. Liquid Treatment Step

The liquid treatment step in the present disclosure is a step of obtaining the active material by bringing the precursor compound into contact with a polar liquid so as to desorb a Na element from the precursor compound.

Examples of the polar liquid may include water; alcohol such as methanol, ethanol, propanol, and butanol; an inorganic acid such as a carboxylic acid (such as a formic acid, an acetic acid, a propionic acid, and a butyric acid), a hydrochloric acid, a nitric acid, and a sulfuric acid; and a carboxylic acid ester such as a methyl acetate, an ethyl butyrate, a butyl acetate, and a butyl butyrate. The polar liquid may be used solely, and may be used in combination of two kinds or more thereof. The stronger the oxidizability of the polar liquid is, the more easily the Na element may be presumably desorbed since the reactivity with the Na element included in the precursor compound is high. Also, an oxidizer such as chlorine, iodine, bromide, and hydrogen peroxide may be dissolved in the polar liquid.

The method of bringing the precursor compound into contact with the polar liquid may include a method of soaking the precursor compound in the polar liquid, and a method of spraying the polar liquid to the precursor compound.

3. Active Material

The active material in the present disclosure has a composition represented by $Na_xM_ySi_{46}$ (M is a metal element other than Na, x and y satisfy $0<x$, $0 \leq y$, $y \leq x$, and $0<x+y<8$).

The "x" usually satisfy 0<x, may satisfy 0.1≤x, and may satisfy 0.5≤x. Meanwhile, the "x" may, for example, satisfy x<8, may satisfy x≤7, may satisfy x≤6, may satisfy x≤5, may satisfy x≤4, may satisfy x≤3, and may satisfy x≤2. Also, the "y" may be 0 and may satisfy 0<y. Also, the "x" and the "y" satisfy y≤x. The molar ratio ((x/(x+y)) of the "x" to the total of the "x" and the "y" is, usually 0.5 or more, may be 0.7 or more, and may be 0.9 or more.

The total (x+y) of the "x" and the "y" usually satisfy 0<x+y, may satisfy 0.1≤x+y, and may satisfy 0.5≤x+y. The x+y usually satisfy x+y<8, may satisfy x+y≤7, may satisfy x+y≤6, may satisfy x+y≤5, may satisfy x+y≤4, may satisfy x+y≤3, and may satisfy x+y≤2.

The active material in the present disclosure has the silicon clathrate I type crystal phase. In particular, the active material in the present disclosure preferably has the silicon clathrate I type crystal phase as a main phase. "Having the silicon clathrate I type crystal phase as a main phase" signifies that any one of the peaks belonging to the silicon clathrate I type crystal phase is the peak having the largest diffraction intensity among the peaks observed in the X-ray diffraction measurement.

Also, it is preferable that the active material in the present disclosure does not have the diamond type Si crystal phase, but a little thereof may be present. Here, the diffraction intensity at the peak of $2\theta=32.82°\pm1.00°$ in the silicon clathrate I type crystal phase is regarded as $I_A$ and the diffraction intensity at the peak of $2\theta=28.44°\pm1.00°$ in the diamond type Si crystal phase is regarded as $I_B$. The ratio of $I_B$ ($I_B/I_A$) to $I_A$ is preferably small. The value of $I_B/I_A$ is, for example, 1.2 or less, may be 1.0 or less, may be 0.5 or less, may be 0.3 or less, may be 0.2 or less, may be 0.1 or less, may be 0.08 or less, and may be 0.06 or less. Meanwhile, the value of $I_B/I_A$ may be 0 and may be larger than 0.

Also, it is preferable that the active material in the present disclosure does not have the silicon clathrate II type crystal phase, but a little thereof may be present. Here, diffraction intensity at the peak of $2\theta=26.51°\pm1.00°$ in the silicon clathrate II type crystal phase is regarded as $I_C$. The ratio of $I_C$ ($I_C/I_A$) to $I_A$ is preferably small. The value of $I_C/I_A$ is, for example, 1 or less, may be 0.8 or less, may be 0.6 or less, may be 0.4 or less, may be 0.2 or less, and may be 0.1 or less. Meanwhile, the value of $I_C/I_A$ may be 0, and may be larger than 0.

Also, it is preferable that the active material in the present disclosure does not have the Zintl phase, but a little thereof may be present. Here, diffraction intensity at the peak of $2\theta=33.60°\pm1.00°$ in the Zintl phase is regarded as $I_D$. The ratio of $I_D$ ($I_D/I_A$) to $I_A$ is preferably small. The value of $I_D/I_A$ is, for example, 0.5 or less, may be 0.25 or less, may be 0.1 or less, and may be 0.05 or less. Meanwhile, the value of $I_D/I_A$ may be 0, and may be larger than 0.

Examples of the shape of the active material in the present disclosure may include a granular shape. The average primary particle size of the active material is, for example, 50 nm or more, may be 100 nm or more, and may be 150 nm or more. Meanwhile, the average primary particle size of the active material is, for example, 3000 nm or less, may be 1500 nm or less, and may be 1000 nm or less. Also, the average secondary particle size of the active material is, for example, 1 μm or more, may be 2 μm or more, may be 5 μm or more, and may be 7 μm or more. Meanwhile, the average secondary particle size of the active material is, for example, 60 μm or less, and may be 40 μm or less. Incidentally, the average primary particle size and the average secondary particle size may be determined by the observation with means such as SEM (scanning electron microscope). The number of samples is preferable a lot; for example, it is 20 or more, may be 50 or more, and may be 100 or more. The average primary particle size and the average secondary particle size may be appropriately adjusted by, for example, appropriately changing the conditions for producing the active material and conducting classification.

Also, on the surface of the active material obtained by each step described above, the residue of the polar liquid may be present and may not be present.

B. Active Material

The active material in the present disclosure is an active material comprising a composition represented by $Na_xM_ySi_{46}$ (M is a metal element other than Na, x and y satisfy 0<x, 0≤y, y≤x, and 0<x+y<8), and a silicon clathrate I type crystal phase; wherein a residue of a polar liquid is present on a surface of the active material.

According to the present disclosure, the presence of the residue of the polar liquid on the surface of the active material may specify that the above described production method was used. The residue amount of the polar liquid is, for example, 1000 ppm or less, and may be 100 ppm or less. Meanwhile, the residue amount of the polar liquid is, for example, 1 ppm or more. The residue amount of the polar liquid may be determined by, for example, adding an effluent (such as methanol) to the active material, conducting centrifugal separation to the product, and analyzing the supernatant liquid thereof by a gas chromatography.

The active material in the present disclosure is in the same contents as those described in "A. Method for producing active material" above; thus, the descriptions herein are omitted. Also, the active material in the present disclosure is usually used in a battery. The battery will be explained in details in "C. Battery" later. Also, the active material in the present disclosure may be an anode active material and may be a cathode active material, but the former is preferable.

C. Battery

Figure 3:
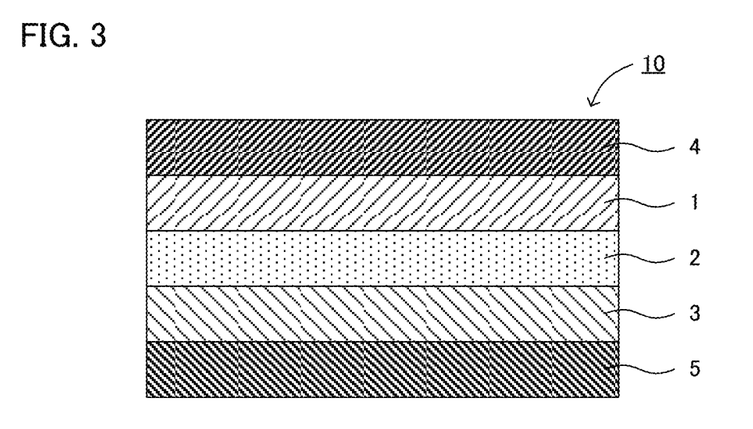
FIG. 3 is a schematic cross-sectional view illustrating an example of the battery in the present disclosure.

FIG. 3 is a schematic cross-sectional view illustrating an example of the battery in the present disclosure. Battery 10 illustrated in FIG. 3 comprises cathode layer 1, electrolyte layer 2, and anode layer 3 in this order in the thickness direction. Battery 10 further comprises cathode current collector 4 for collecting currents of cathode layer 1, and anode current collector 5 for collecting currents of anode layer 3. Incidentally, although not illustrated in particular, battery 10 may comprise a known outer package. One of the features of the present disclosure is that anode layer 3 contains the active material described in "B. Active material" above.

According to the present disclosure, the anode layer contains the above described active material (silicon clathrate compound) and thus the volume change of the battery due to charge and discharge may be small. Accordingly, a battery with excellent battery characteristics such as capacity may be obtained.

1. Anode Layer

The anode layer is a layer that contains at least an anode active material. In the present disclosure, the active material (silicon clathrate compound) described in "B. Active material" above is used as the anode active material.

The anode layer may contain, as the anode active material, just the silicon clathrate compound, and may further contain an additional active material thereto. In the latter case, the proportion of the silicon clathrate compound in the entire anode active materials may be, for example, 50 weight % or more, may be 70 weight % or more, and may be 90 weight % or more.

The proportion of the anode active material in the anode layer is, for example, 20 weight % or more, may be 30 weight % or more, and may be 40 weight % or more. Meanwhile, the proportion of the anode active material is, for example, 80 weight % or less, may be 70 weight % or less, and may be 60 weight % or less.

Also, the anode layer may contain at least one of a liquid electrolyte, a conductive material, and a binder, as required. The electrolyte will be explained in details in "3. Electrolyte layer" later. Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT) and carbon nanofiber (CNF). Also, examples of the binder may include a rubber-based binder and a fluoride-based binder.

The thickness of the anode layer is, for example, 0.1 μm or more and 1000 μm or less.

2. Cathode Layer

The cathode layer is a layer that contains at least a cathode active material. Also, the cathode layer may contain at least one of a liquid electrolyte, a conductive material, and a binder, as required.

Examples of the cathode active material may include an oxide active material. Examples of the oxide active material used in a lithium ion battery may include a rock salt bed type active material such as $LiCoO_2$, $LiMnO_2$, $LiNiO_2$, $LiVO_2$, $LiNi_{1/3}Co_{1/3}Mn_{1/3}O_2$, a spinel type active material such as $LiMn_2O_4$, $Li_4Ti_5O_{12}$, and $Li(Ni_{0.5}Mn_{1.5})O_4$, and an olivine type active material such as $LiFePO_4$, $LiMnPO_4$, $LiNiPO_4$, and $LiCoPO_4$.

Meanwhile, examples of the oxide active material used in a sodium ion battery may include an $O_3$ type layered shape active material, a $P_2$ type layered shape active material, a $P_3$ type layered shape active material, and an Alluaudite type active material.

The proportion of the cathode active material in the cathode layer is, for example, 20 weight % or more, may be 30 weight % or more, and may be 40 weight % or more. Meanwhile, the proportion of the cathode active material is, for example, 80 weight % or less, may be 70 weight % or less, and may be 60 weight % or less.

The conductive material and the binder to be used in the cathode layer are in the same contents as those described in "1. Anode layer" above; thus, the descriptions herein are omitted. Meanwhile, the electrolyte to be used in the cathode layer will be described in details in "3. Electrolyte layer" later.

The thickness of the cathode layer is, for example, 0.1 μm or more and 1000 μm or less.

3. Electrolyte Layer

The electrolyte layer is a layer that is formed between the cathode layer and the anode layer and that contains at least an electrolyte. The electrolyte may be a solid electrolyte, may be an electrolyte solution (liquid electrolyte), and may be a mixture of these. There are no particular limitations on the kind of the electrolyte, and it may be appropriately selected in accordance with the kind of batteries.

Typical examples of the solid electrolyte may include an inorganic solid electrolyte such as a sulfide solid electrolyte, an oxide solid electrolyte, a nitride solid electrolyte, and a halide solid electrolyte; and an organic polymer electrolyte such as a polymer electrolyte.

Examples of the sulfide solid electrolyte having lithium ion conductivity may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element. Examples of the oxide solid electrolyte having lithium ion conductivity may include a solid electrolyte containing a Li element, a Y element (Y is at least one kind of Nb, B, Al, Si, P, Ti, Zr, Mo, W, and S), and an O element.

Examples of the oxide solid electrolyte having sodium ion conductivity may include a nasicon type solid electrolyte, a perovskite type solid electrolyte, and a β-alumina. Also, examples of the nitride solid electrolyte having lithium ion conductivity may include $Li_3N$. Examples of the halide solid electrolyte having lithium ion conductivity may include LiCl, LiI, LiBr, and $Li_3YCl_6$.

The liquid electrolyte preferably contains a supporting electrolyte and a solvent. Examples of the supporting electrolyte (lithium salt) for the liquid electrolyte having lithium ion conductivity may include an inorganic lithium salt such as $LiPF_6$, $LiBF_4$, $LiClO_4$, and $LiAsF_6$; and an organic lithium salt such as $LiCF_3SO_3$, $LiN(CF_3SO_2)_2$, $LiN(C_2F_5SO_2)_2$, $LiN(FSO_2)_2$, and $LiC(CF_3SO_2)_3$. On the other hand, examples of the supporting electrolyte (sodium salt) for the liquid electrolyte having sodium ion conductivity may include an inorganic sodium salt such as $NaPF_6$, $NaBF_4$, $NaClO_4$, and $NaAsF_6$; and an organic sodium salt such as $NaCF_3SO_3$, $NaN(CF_3SO_2)_2$, $NaN(C_2F_5SO_2)_2$, $NaN(FSO_2)_2$, and $NaC(CF_3SO_2)_3$.

There are no particular limitations on the solvent to be used in the liquid electrolyte, but a mixture solvent containing a high permittivity solvent and a low viscosity solvent is preferable. Examples of the high permittivity solvent may include a cyclic ester (cyclic carbonate) such as ethylene carbonate (EC), propylene carbonate (PC), and butylene carbonate (BC); γ-butyrolactone, sulfolane, N-methylpyrrolidone (NMP), and 1,3-dimethyl-2-imidazolidinone (DMI). Meanwhile, examples of the low viscosity solvent may include a chain ester (chain carbonate) such as dimethyl carbonate (DMC), diethyl carbonate (DEC), and ethyl methyl carbonate (EMC); acetates such as methyl acetate and ethyl acetate; and ether such as 2-methyltetrahydrofuran. Incidentally, the solvent to be used in the liquid electrolyte may be a nonaqueous solvent, and may be an aqueous solvent. Also, the electrolyte layer may include a separator.

The thickness of the electrolyte layer is, for example, 0.1 μm or more and 1000 μm or less.

4. Other Constitutions

The battery in the present disclosure comprises at least the above described anode layer, cathode layer, and electrolyte layer, and usually further comprises a cathode current collector for collecting currents of the cathode layer, and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon.

5. Battery

The battery in the present disclosure is usually a battery in which metal ions conduct between the cathode layer and the anode layer. Examples of such a battery may include a lithium ion battery, a sodium ion battery, a potassium ion battery, a magnesium ion battery, and a calcium ion battery. Also, the battery in the present disclosure may be a liquid battery in which the electrolyte contains a liquid electrolyte, and may be an all solid state battery in which the electrolyte layer contains a solid electrolyte.

Also, the battery in the present disclosure may be a primary battery and may be a secondary battery, but preferably a secondary battery among them, so as to be repeatedly charged and discharged, and useful as a car-mounted battery, for example. The secondary battery also includes the usage of the secondary battery as a primary battery (usage for the purpose of just first time charge). Examples of the shape of the battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Comparative Example 1

<Synthesis of Anode Active Material>

Si particles (purity: 99.999%) and metal Na (purity: 99.5%) were weighed so as to be the Si particles:the metal Na=1:1.1 in the molar ratio, projected into a melting pot made of boron nitride, and the pot was sealed under an Ar atmosphere. After that, a heat treatment was conducted to the pot with the conditions of at 700° C. and for 20 hours. Thereby, a NaSi compound (compound having Zintl phase) was obtained. The obtained NaSi compound was crushed into powder and heated in the condition of under a vacuum atmosphere (approximately 0.1 Pa) and temperature rising speed of 15° C./min. After the temperature reached at 400° C., a heat treatment was conducted for 5 hours to desorb Na. The obtained compound (precursor compound) was crushed into powder by a mortar. After that, the particle sizes were adjusted by classification and an anode active material particle A (average secondary particle size=5 μm) and an anode active material particle B (average secondary particle size=3 μm) were obtained.

<Production of Evaluation Battery>

Solid electrolyte particles ($Li_3PS_4$) of 0.4 g, the obtained anode active material particle A of 0.8 g, a conductive material (VGCF) of 0.06 g, and a binder solution (butyl butyrate solution containing 5 weight % of PVDF-based resin) of 0.32 g were added to a container made of polypropylene. An ultrasonic treatment was conducted to the container for 30 seconds in an ultrasonic dispersion device, and a shaking treatment using a shaker was conducted to the container for 30 minutes, so as to obtain slurry A that had relatively large content of the anode active material.

Also, solid electrolyte particles ($Li_3PS_4$) of 0.7 g, the obtained anode active material particle B of 0.6 g, a conductive material (VGCF) of 0.06 g, and a binder solution (butyl butyrate solution containing 5 weight % of PVDF-based resin) of 0.24 g were added to a container made of polypropylene. An ultrasonic treatment was conducted to the container for 30 seconds in an ultrasonic dispersion device, and a shaking treatment using a shaker was conducted to the container for 30 minutes, so as to obtain slurry B that had relatively small content of the anode active material.

The slurry A was pasted on an anode current collector (copper foil) by a blade method using an applicator, and was dried naturally for 60 minutes. After that, the slurry was dried on a hot plate adjusted to 100° C. for 30 minutes. Thereby, an anode structural body having an anode layer and the anode current collector was obtained.

Next, solid electrolyte particles ($Li_3PS_4$) of 0.3 g, cathode active material particles ($LiNi_{1/3}Co_{1/3}Mn_{1/3}O_2$) of 2 g, a conductive material (VGCF) of 0.03 g, and a binder solution (butyl butyrate solution containing 5 weight % of PVDF-based resin) of 0.3 g were added to a container made of polypropylene. An ultrasonic treatment was conducted to the container for 30 seconds in an ultrasonic dispersion device, and a shaking treatment using a shaker was conducted to the container for 30 minutes, so as to obtain slurry. The obtained slurry was pasted on a cathode current collector (aluminum foil) by a blade method using an applicator, and was dried naturally for 60 minutes, and then dried on a hot plate adjusted to 100° C. for 30 minutes. Thereby, a cathode structural body having a cathode layer and the cathode current collector was obtained.

Next, solid electrolyte particles ($Li_3PS_4$, average particle size $D_{50}$=2 μm) of 0.4 g, and a binder solution (a heptane solution containing 5 weight % of ABR-based resin) of 0.05 g were added to a container made of polypropylene. An ultrasonic treatment was conducted to the container for 30 seconds in an ultrasonic dispersion device, and a shaking treatment using a shaker was conducted to the container for 30 minutes, so as to obtain slurry. The obtained slurry was pasted on a supporting medium (aluminum foil) by a blade method using an applicator, and was dried naturally for 60 minutes, and then dried on a hot plate adjusted to 100° C. for 30 minutes. Thereby, a solid electrolyte layer was formed.

Next, the anode structural body, the solid electrolyte layer, and the cathode structural body were stacked in this order, and an obtained stacked body was pressed in the conditions of at 130° C., with 200 MPa and for 3 minutes, to obtain an evaluation battery.

Example 1

A precursor compound was obtained in the same manner as in Comparative Example 1. The obtained precursor compound was soaked in ethanol for 24 hours. After 24 hours passed, the anode active material particles A and B were confirmed to be precipitated, the supernatant liquid thereof was removed by decantation, and the precipitated powder was dried. The dried powder was crushed into pieces by a mortar. After that, the particle sizes were adjusted by classification, and anode active material particle A (average secondary particle size=5 μm) and anode active material particle B (average secondary particle size=3 μm) were obtained. An evaluation battery was obtained in the same manner as in Comparative Example 1 except that the obtained anode active material particles A and B were used.

Example 2

An evaluation battery was obtained in the same manner as in Example 1, except that water was used instead of ethanol.

Comparative Examples 2 to 6

Evaluation batteries were obtained in the same manner as in Comparative Example 1, except that the conditions of vacuum heat treatment were changed to the conditions described in Table 1.

Comparative Example 7

An evaluation battery was obtained in the same manner as in Comparative Example 1, except that Si particles having the diamond type crystal phase were used as the anode active material.

[Evaluation]
<XRD Measurement>

Figure 4:
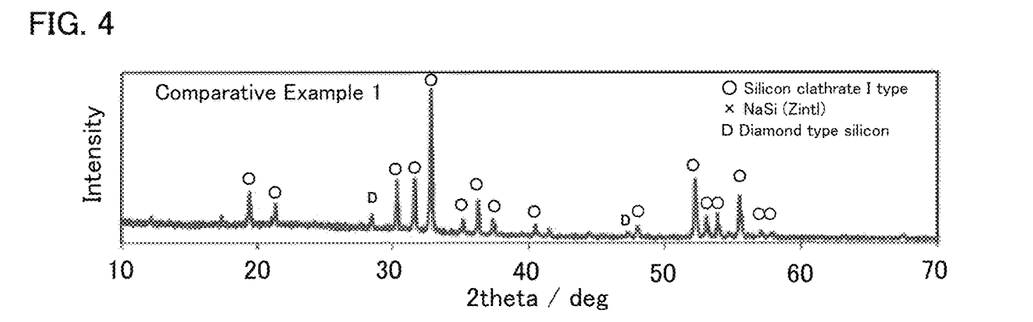
FIG. 4 is the result of an XRD measurement for the anode active material obtained in Comparative Example 1.
Figure 5:
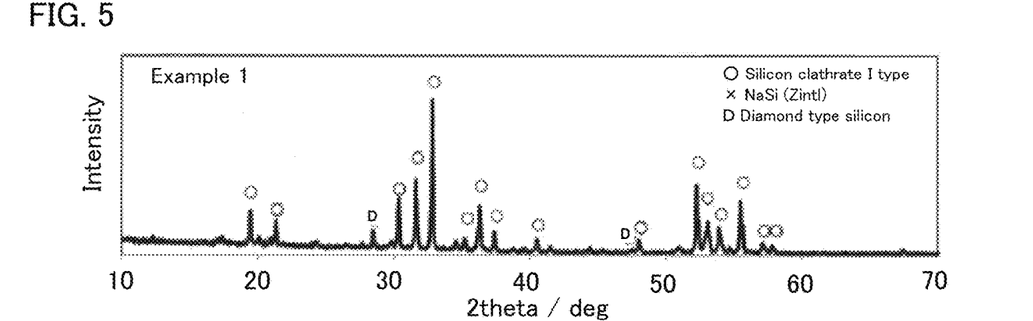
FIG. 5 is the result of an XRD measurement for the anode active material obtained in Example 1.
Figure 6:
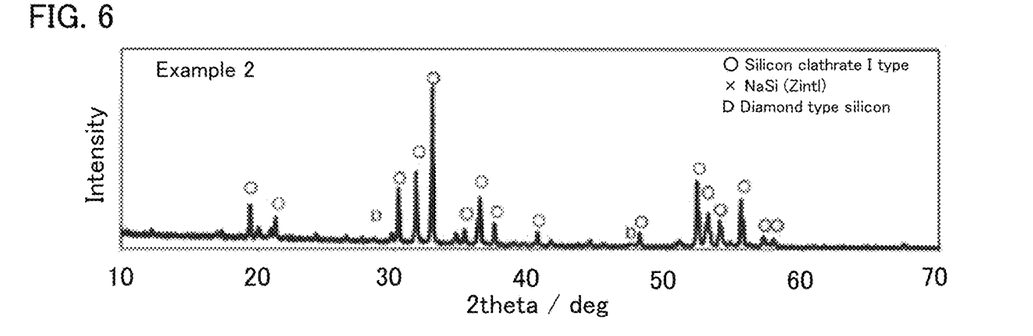
FIG. 6 is the result of an XRD measurement for the anode active material obtained in Example 2.

An X-ray diffraction (XRD) measurement using a CuKα ray was conducted to the anode active materials obtained in Examples 1, 2, and Comparative Examples 1 to 6. The results are shown in FIG. 4 to FIG. 11. As shown in FIG. 4 to FIG. 6, the typical peaks of the silicon clathrate I type crystal phase were confirmed in Examples 1, 2, and Comparative Example 1. Also, the peak of the diamond type Si crystal phase was slightly confirmed in Examples 1, 2, and Comparative Example 1.

Figure 7:
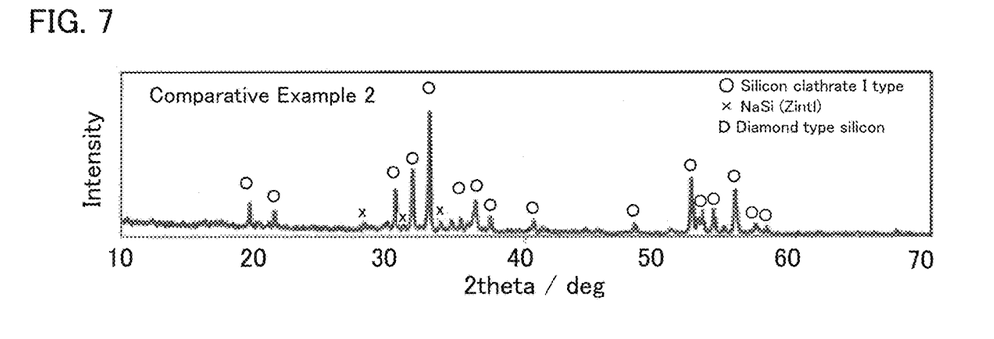
FIG. 7 is the result of an XRD measurement for the anode active material obtained in Comparative Example 2.
Figure 8:
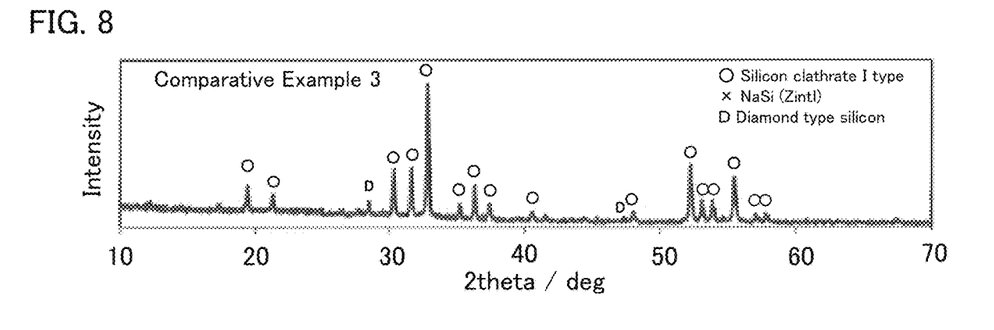
FIG. 8 is the result of an XRD measurement for the anode active material obtained in Comparative Example 3.
Figure 9:
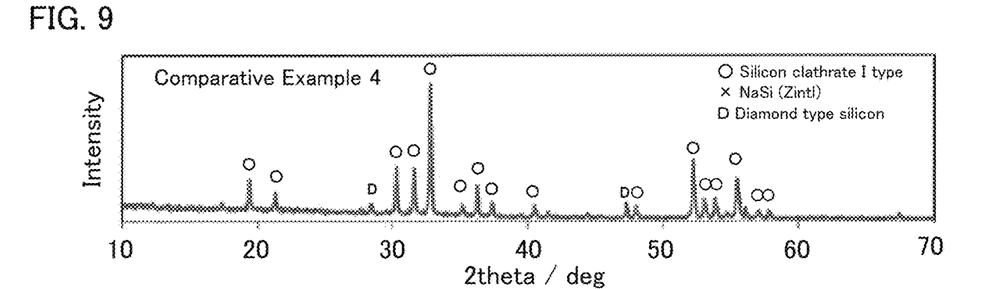
FIG. 9 is the result of an XRD measurement for the anode active material obtained in Comparative Example 4.
Figure 10:
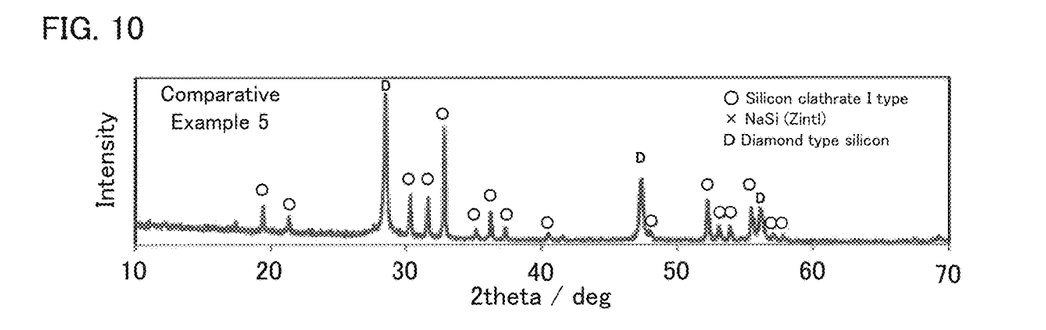
FIG. 10 is the result of an XRD measurement for the anode active material obtained in Comparative Example 5.
Figure 11:
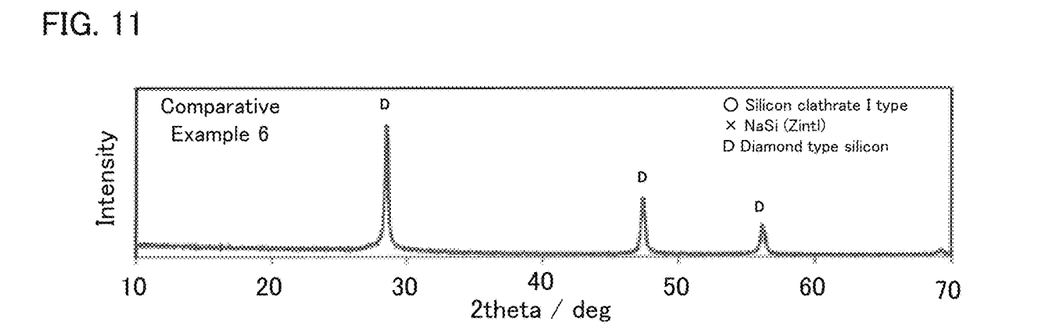
FIG. 11 is the result of an XRD measurement for the anode active material obtained in Comparative Example 6.

Also, as shown in FIG. 7, the peaks of the silicon clathrate I type crystal phase was confirmed in Comparative Example 2, and at the same time, the peak of the Zintl phase was slightly confirmed. Meanwhile, the peak of the diamond type Si crystal phase was not confirmed in Comparative Example 2. Also, as shown in FIG. 8 and FIG. 9, the peaks of the silicon clathrate I type crystal phase were confirmed in both Comparative Examples 3 and 4, and at the same time, the peak of the diamond type Si crystal phase was slightly confirmed. Also, as shown in FIG. 10, the peaks of the silicon clathrate I type crystal phase and the peaks of the diamond type Si crystal phase were confirmed in Comparative Example 5. On the other hand, as shown in FIG. 11, although the peaks of the diamond type Si crystal phase were confirmed, the peak of the silicon clathrate I type crystal phase was not confirmed in Comparative Example 6. Also, the values of $I_B/I_A$ were determined based on each chart. The results are shown in Table 1.

<SEM-EDX Measurement>

A SEM-EDX (scanning electron microscope-energy dispersive X-ray spectroscopy) measurement was conducted to the anode active materials obtained in Examples 1, 2, and Comparative Examples 1 to 6, and Na/Si thereof was measured. The Na/Si was calculated from the atomic ratio based on the signal intensity ratio of Na and Si in an EDX analysis. From the Na/Si, "x" in $Na_xSi_{46}$ was obtained. The results are shown in Table 1.

<Charge and Discharge Test>

Figure 12:
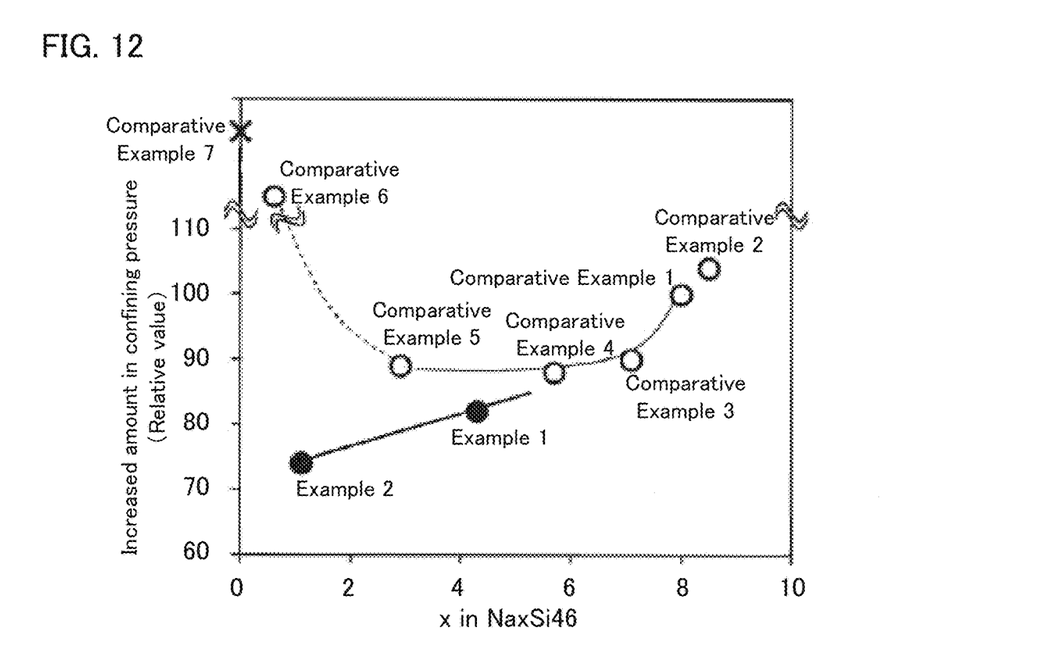
FIG. 12 is a graph showing the relation between Na amount x and increased amount in confining pressure.

A charge and discharge test was conducted to the evaluation batteries obtained in Examples 1, 2, and Comparative Examples 1 to 6. The conditions of the charge and discharge test were: confining pressure (constant rate) of 5 MPa, charge at 0.1 C, discharge at 1 C, and cut voltage of 3.0 V to 4.55 V, and the first charge capacity and the first discharge capacity were respectively obtained therefrom. The results are shown in Table 1. Also, during the first charge, the confining pressure of each evaluation battery was monitored, the confining pressure at 4.55 V was measured, and the increased amount in the confining pressure from the state before charge and discharge was obtained. The results are shown in Table 1. Incidentally, the results of the increased amount in confining pressure in Table 1 are relative values when the result of Comparative Example 1 is regarded as 100. Also, the relation between Na amount x and the increased amount in confining pressure is shown in FIG. 12.

TABLE 1

|  | Vacuum heat treatment | | x in $Na_xSi_{46}$ | Liquid treatment | $I_B/I_A$ | Increased amount in confining pressure | First charge capacity [mAh/g] | First discharge capacity [mAh/g] |
| --- | --- | --- | --- | --- | --- | --- | --- | --- |
|  | Temperature [° C.] | Hour [h] | | | | | | |
| Comparative Example 1 | 450 | 5 | 8.0 | None | 0.06 | 100 | 233 | 188 |
| Example 1 | 450 | 5 | 4.3 | EtOH | 0.08 | 82 | 232 | 189 |
| Example 2 | 450 | 5 | 1.1 | $H_2O$ | 0 | 74 | 232 | 187 |
| Comparative Example 2 | 400 | 5 | 8.5 | None | 0.02 | 104 | 239 | 194 |
| Comparative Example 3 | 400 | 12 | 7.1 | None | 0.08 | 90 | 236 | 191 |
| Comparative Example 4 | 450 | 12 | 5.7 | None | 0.04 | 88 | 234 | 187 |
| Comparative Example 5 | 500 | 5 | 2.9 | None | 1.2 | 89 | 232 | 187 |
| Comparative Example 6 | 550 | 5 | 0.6 | None | — | 431 | 237 | 192 |
| Comparative Example 7 | — | — | 0 | None | — | 625 | 235 | 185 |

As shown in Table 1, the charge capacity and the discharge capacity in Examples 1, 2, and Comparative Examples 1 to 6 were almost the same as those in Comparative Example 7. It means, it was confirmed that the active materials obtained in Examples 1, 2, and Comparative Examples 1 to 6 had the same efficiency as that of conventional Si particles. Also, when Examples 1 and 2 were compared to Comparative Example 1, it was confirmed that Na element was efficiently desorbed by the liquid treatment, while maintaining the silicon clathrate I type crystal structure. Along with that, the increased amount in confining pressure was also largely decreased. Also, in FIG. 12, when Examples 1 and 2 were compared to Comparative Examples 5 and 6, although the values of "x" were in the same level, there was a difference in the increased amount in confining pressure. It was presumed that the increased amount in confining pressure became large in Comparative Examples 5 and 6 since the proportion of the diamond type Si crystal phase in the active materials was large. On the other hand, in the active materials in Examples 1 and 2, the proportion of the silicon clathrate I type crystal phase was large and the proportion of the diamond type Si crystal phase was small; thus, it was presumed that the increased amount in confining pressure was largely decreased.

Also, in Example 1, it was confirmed that foaming occurred when the precursor compound was soaked in ethanol. The presumable chemical reaction occurred is as follows:

$Na_8Si_{46} + xC_2H_5OH \rightarrow Na_{(8-x)}Si_{46} + xC_2H_5ONa + (x/2)H_2$.

In the same manner, in Example 2, it was confirmed that foaming occurred when the precursor compound was soaked in water. The presumable chemical reaction occurred is as follows:

$Na_8Si_{46} + xH_2O \rightarrow Na_{(8-x)}Si_{46} + xNaOH + (x/2)H_2$.

Incidentally, when the diamond type Si crystal phase occurs, presumable chemical reaction to be occurred is as follows:

$Na_8Si_{46} \rightarrow 8Na(gas) + 46Si(diamond)$.

By such a chemical reaction, it is presumed that Na element was efficiently desorbed in Examples 1 and 2 while maintaining the silicon clathrate I type crystal structure.

REFERENCE SIGNS LIST

1 . . . cathode layer
2 . . . electrolyte layer
3 . . . anode layer
4 . . . cathode current collector
5 . . . anode current collector
10 . . . battery

What is claimed is:

1. A method for producing an active material having a composition represented by $Na_xM_ySi_{46}$ (M is a metal element other than Na, x and y satisfy $0<x$, $0\leq y$, $y\leq x$, and $0<x+y<8$), and a silicon clathrate I type crystal phase, the method comprising:
a preparing step of preparing a precursor compound having the silicon clathrate I type crystal phase; and
a liquid treatment step of bringing the precursor compound into contact with a polar liquid so as to desorb a Na element from the precursor compound and obtain the active material.

2. The method for producing the active material according to claim 1, wherein the polar liquid contains at least one kind of water, alcohol, and inorganic acid.

3. The method for producing the active material according to claim 1, wherein the polar liquid contains at least one kind of water and alcohol.

4. The method for producing the active material according to claim 1, wherein the preparing step is a step of conducting a heat treatment to a NaSi compound containing at least a Na element and a Si element under decompressed pressure so as to desorb the Na element from the NaSi compound and obtain the precursor compound.

5. The method for producing the active material according to claim 4, wherein, in the heat treatment, heat treatment temperature is less than 550° C. and heat treatment time is 12 hours or less.

6. The method for producing the active material according to claim 1, wherein the x and they satisfy $1.1\leq x+y$.

7. An active material comprising a composition represented by $Na_xM_ySi_{46}$ (M is a metal element other than Na, x and y satisfy $0<x$, $0\leq y$, $y\leq x$, and $0<x+y<8$), and a silicon clathrate I type crystal phase; wherein
a residue of a polar liquid is present on a surface of the active material.

8. The active material according to claim 7, wherein the residue of the polar liquid contains at least one kind of alcohol and inorganic acid.

9. A battery comprising a cathode layer, an electrolyte layer, and an anode layer in this order, wherein
the anode layer contains the active material according to claim 7.

10. The active material according to claim 7, wherein x is less than or equal to 4.3.

11. The active material according to claim 7, wherein y is greater than 0.

12. The active material according to claim 7, wherein an average primary particle size of the composition is 50 nanometers (nm) or more.

13. The active material according to claim 12, wherein the average primary particle size of the composition is 3,000 nm or less.

14. The active material according to claim 12, wherein an average secondary particle size of the composition is 1 micron (μm) or more.

15. The active material according to claim 14, wherein the average secondary particle size is 60 μm or less.

16. The active material according to claim 7, wherein a ratio of a diamond type crystal phase to the silicon clathrate I type crystal phase to in the composition is 1.2 or less.

17. The active material according to claim 7, wherein a ratio of a silicon clathrate II type crystal phase to the silicon clathrate I type crystal phase to in the composition is 1 or less.

18. The active material according to claim 7, wherein a ratio of a Zintl crystal phase to the silicon clathrate I type crystal phase to in the composition is 0.5 or less.

19. The active material according to claim 7, wherein M is an alkali metal element or an alkaline earth metal element, and y is greater than 0.

20. The active material according to claim 7, wherein y is greater than 0, and M is selected from the group consisting of an $11^{th}$ group element, a $12^{th}$ group element, a $13^{th}$ group element, a $15^{th}$ group element and a $16^{th}$ group element.

* * * * *